(12) United States Patent
Li

(10) Patent No.: US 11,377,299 B2
(45) Date of Patent: Jul. 5, 2022

(54) WAREHOUSING ACCESS SYSTEM AND METHOD

(71) Applicant: BEIJING GEEKPLUS TECHNOLOGY CO., LTD., Beijing (CN)

(72) Inventor: Hongbo Li, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 90 days.

(21) Appl. No.: 16/637,829

(22) PCT Filed: Apr. 18, 2019

(86) PCT No.: PCT/CN2019/083150
§ 371 (c)(1),
(2) Date: Feb. 10, 2020

(87) PCT Pub. No.: WO2020/052238
PCT Pub. Date: Mar. 19, 2020

(65) Prior Publication Data
US 2021/0214164 A1    Jul. 15, 2021

(30) Foreign Application Priority Data

Sep. 10, 2018 (CN) .......................... 201811051974.7

(51) Int. Cl.
*G06F 7/00* (2006.01)
*B65G 1/137* (2006.01)
(Continued)

(52) U.S. Cl.
CPC ......... *B65G 1/1373* (2013.01); *B65G 1/0485* (2013.01); *B65G 1/0492* (2013.01); *B66F 9/063* (2013.01); *B66F 9/0755* (2013.01)

(58) Field of Classification Search
CPC .. B65G 1/1373; B65G 1/0485; B65G 1/0492; B66F 9/0755; B66F 9/063
(Continued)

(56) References Cited

U.S. PATENT DOCUMENTS 9,733,646 B1 * 8/2017 Nusser ................... B65G 1/137
10,894,664 B1 * 1/2021 Brady .................. B65G 1/1378
(Continued)

FOREIGN PATENT DOCUMENTS

CN    108238402 A    7/2018
CN    109250380 A    1/2019
(Continued)

*Primary Examiner* — Yolanda R Cumbess
(74) *Attorney, Agent, or Firm* — ArentFox Schiff LLP

(57) ABSTRACT

Provided are a warehousing access system and method. The system includes a control server, an access device, a carrying device, a storage container and a dock location; in response to an item operation request, the control server controls a first target access device to take a target storage container out from a current storage location and carry to a first target dock location, and controls a first target carrying device to carry a first target storage container from the first target dock location to a workstation for operation; in response to an operation complete instruction, the control server controls a second target carrying device to carry the target storage container from the workstation to a second target dock location and controls a second target access device to carry the target storage container from the second target dock location to a storage area and store at the target storage location.

17 Claims, 6 Drawing Sheets

(51) Int. Cl.
*B65G 1/04* (2006.01)
*B66F 9/06* (2006.01)
*B66F 9/075* (2006.01)

(58) Field of Classification Search
USPC .............................. 700/213–217, 226, 229
See application file for complete search history.

(56) References Cited

U.S. PATENT DOCUMENTS

| | | | |
|---|---|---|---|
| 2013/0103552 A1* | 4/2013 | Hoffman | G08G 1/096708 |
| | | | 705/28 |
| 2013/0177379 A1* | 7/2013 | Hoffman | B65G 1/1375 |
| | | | 414/800 |
| 2016/0145045 A1* | 5/2016 | Mountz | G06Q 10/087 |
| | | | 700/218 |
| 2017/0203920 A1 | 7/2017 | Otto et al. | |
| 2017/0313517 A1 | 11/2017 | Agarwal et al. | |
| 2018/0016098 A1 | 1/2018 | Lert et al. | |

FOREIGN PATENT DOCUMENTS

| | | | |
|---|---|---|---|
| JP | 2001130711 A | 5/2001 | |
| JP | 2018516824 A | 6/2018 | |
| WO | 2015059740 A1 | 4/2015 | |
| WO | 2016199033 A1 | 12/2016 | |

* cited by examiner

WAREHOUSING ACCESS SYSTEM AND METHOD

CROSS-REFERENCES TO RELATED APPLICATIONS

This application is a United States National Stage Application of co-pending International Patent Application Number PCT/CN2019/083150, filed on Apr. 18, 2019, which claims priority to Chinese patent application No. 201811051974.7 filed on Sep. 10, 2018, the contents of which are incorporated herein by reference in their entireties.

TECHNICAL FIELD

Embodiments of the present application relate to the field of warehousing technologies and, for example, to a warehousing access system and method.

BACKGROUND

With the economy blooming, the warehousing technology has been widely applied in life. The decrease in the access costs of warehouses is especially important for the development of this industry.

In the existing art, goods in a traditional warehouse are accessed through a pallet truck or an electric forklift, i.e., the forklift takes a container (such as a tray which can hold bulk goods) holding goods from a rack, and then carries the container to a designated location for specified operations such as carrying to a workstation for picking or replenishing. Similarly, the forklift grasps the container holding the goods from the designated location (such as the workstation) and carries the container to the rack for storing the container at a designated location on the rack.

However, the existing technology entirely relies on the forklift for goods accessing and carrying, which requires a larger number of forklifts. However, the forklifts are expensive, which causes high storage costs in the existing technology, and difficulty in adapting to the industry development.

SUMMARY

A summary of the subject matter is described hereinafter in detail. This summary is not intended to limit the scope of the claims.

Embodiments of the present application provide a warehousing access system and method, which are able to reduce warehousing costs.

In a first aspect, an embodiment of the present disclosure provides a warehousing access system. The system includes: a control server, at least one access device, at least one carrying device, a storage container and at least one dock location; the at least one access device and the at least one carrying device are communicatively connected to the control server separately, the storage container is located at a storage area and is configured to hold items; the at least one access device includes a first target access device and a second target access device, the at least one carrying device includes a first target carrying device and a second target carrying device, the storage container includes a target storage container, the at least one dock location includes a first target dock location and a second target dock location; the control server is configured to, in response to an item operation request, determine a target storage container for operation, a first target dock location for docking the target storage container, a first target access device for taking the target storage container out, and a first target carrying device for carrying the target storage container, and send a container take-out instruction to the first target access device and a container carrying instruction to the first target carrying device; the first target access device is configured to, in response to the container take-out instruction, take the target storage container out from a current storage location and carry to the first target dock location; the first target carrying device is configured to, in response to the container carrying instruction, carry the target storage container from the first target dock location to a workstation for operation; the control server is further configured to, in response to an operation complete instruction, determine a target storage location for storing the target storage container, a second target dock location for docking the target storage container, the second target access device for storing the target storage container, and the second target carrying device for carrying the target storage container, and send a container storing instruction to the second target access device and the container carrying instruction to the second target carrying device; the second target carrying device is further configured to, in response to the container carrying instruction, carry the target storage container from the workstation to the second target dock location; and the second target access device is further configured to, in response to the container storing instruction, carry the target storage container from the second target dock location to the storage area and store at the target storage location.

In a second aspect, an embodiment of the present application provides a warehousing access method. In the method, a control server determines, according to an item operation request, a target storage container for operation, a first target dock location for docking the target storage container, a first target access device for taking the target storage container out, and a first target carrying device for carrying the target storage container, and sends a container take-out instruction to the first target access device and a container carrying instruction to the first target carrying device; the first target access device takes, according to the container carrying instruction, the target storage container out from a current storage location and carries to the first target dock location; the first target carrying device carries, according to the container carrying instruction, the first target storage container from the first target dock location to a workstation for operation; the control server determines, according to an operation complete instruction, a target storage location for storing the target storage container, a second target dock location for docking the target storage container, a second target access device for storing the target storage container, and a second target carrying device for carrying the target storage container, and sends a container storing instruction to the second target access device and the container carrying instruction to the second target carrying device; the second target carrying device carries, according to the container carrying instruction, the target storage container from the workstation to the second target dock location; and the second target access device carries, according to the container storing instruction, the target storage container from the second target dock location to a storage area and stores at the target storage location.

Other aspects can be understood after the drawings and detailed description are read and understood.

DETAILED DESCRIPTION

Embodiments of the present disclosure will be described hereinafter in one embodiment with reference to the drawings and embodiments. It is to be understood that specific embodiments set forth below are intended to illustrate and not to limit the embodiments of the present application. Additionally, it is to be noted that to facilitate description, only part, not all, of structures related to the embodiments of the present application are illustrated in the accompanying drawings.

Figure 1:
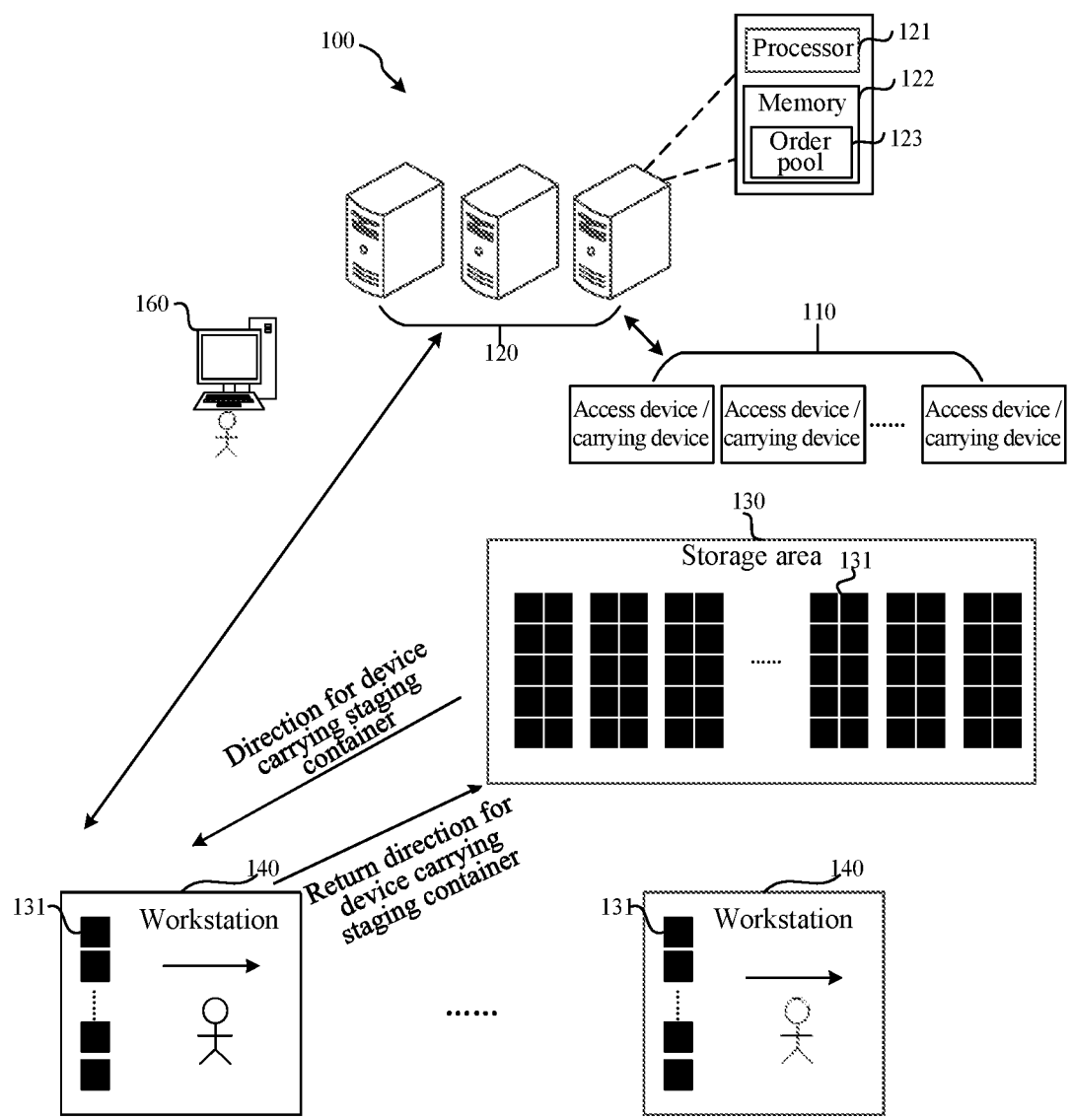
FIG. 1 is a structural diagram of a warehousing access system provided by an embodiment of the present application.

Referring to a structural diagram of a warehousing access system shown in FIG. 1, the system 100 includes an access device/carrying device 110, a control system 120, a storage area 130 and a workstation 140. The storage area 130 is provided with multiple container supports 131. A storage container or multiple items are placed on the container supports 131. Similar to racks placed with multiple items in the supermarket, multiple racks are arranged in an array.

The control system 120 performs wireless communication with the access device/the carrying device 110. A worker may operate the control system 120 through an operation desk 160. The access device/the carrying device 110 perform items accessing/carrying tasks under the control of the control system 120. For example, the control system 120 plans a movement path for the carrying device 110 according to the carrying task, and the access device/the carrying device 110 moves along an empty space (a part of a passageway for the access device/the carrying device 110) in the rack array according to the movement path. To facilitate planning the movement path for the access device/the carrying device 110, a work area of the access device/the carrying device 110 (the work area at least includes an area in which the storage area 130 and the workstation 140 are located) is divided into multiple subareas (i.e., cells), and the access device/the carrying device 110 moves along the subareas one by one to form the movement path.

Figure 2:
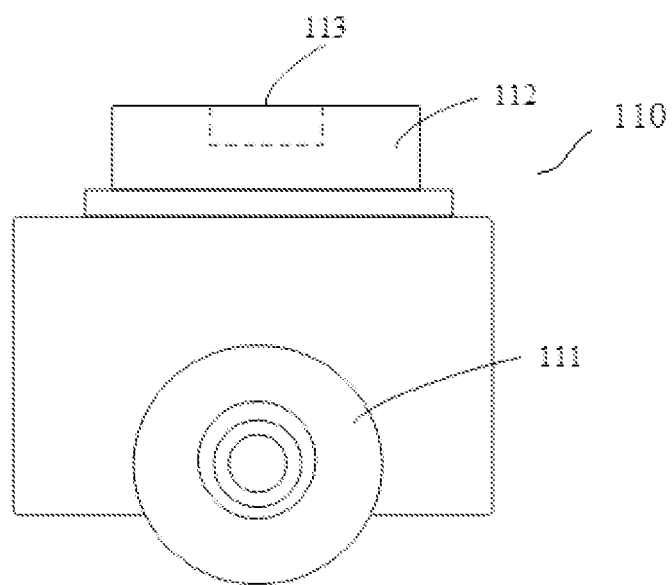
FIG. 2 is a structural diagram of a robot provided by an embodiment of the present application.

The access device may be a forklift or a stacking robot, and the carrying device may be a carrying robot. In a case in which the carrying device is a robot, referring to FIG. 2, the robot 110 may include a driving mechanism 111. Through the driving mechanism 111, the robot 110 may move in the working space. The robot 110 may further include a lifting mechanism 112 for lifting a target storage container or an auxiliary support containing the target storage container. The robot 110 may move to the underneath of the target storage container or the auxiliary support, lift the storage container or the auxiliary support (with the storage container) by using the lifting mechanism 112, and carry the storage container or the auxiliary support to an allocated workstation 140. When the lifting mechanism 112 ascends, the entire storage container or auxiliary support (with the storage container) is lifted from the ground so that the robot 110 carries the storage container or the auxiliary support (with the storage container); and when the lifting mechanism 112 descends, the storage container or the auxiliary support (with storage container) is placed on the ground. An identification component 113 on the robot 110 is able to effectively identify the storage container or the auxiliary support when the robot 110 lifts the storage container or the auxiliary support (with the storage container).

In addition, if the robot is based on visual navigation, the robot 110 may further include a navigation identification component (not shown in FIG. 2) for identifying a navigation mark (such as a two-dimensional code) laying on the ground. Of course, the robot 110 may further include a control module (not shown in FIG. 2) that controls the entire robot to implement functions such as movement and navigation. In an example, the robot 110 at least includes an upward-directed camera and a downward-directed camera. The robot is able to move forward according to two-dimensional code information (or other ground markers) captured by the downward-directed camera, and is able to move to the underneath of the storage container or the auxiliary support prompted by the control system 120 according to a route determined by the control system 120.

Figure 3:
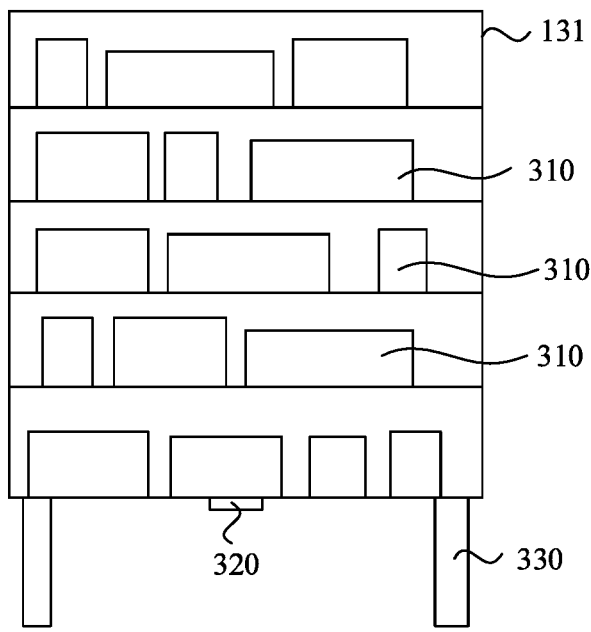
FIG. 3 is a schematic diagram of a rack provided by an embodiment of the present application.

FIG. 3 is a schematic diagram of a rack 131 provided by an embodiment of the present application. As shown in FIG. 3, items 310 are stored on the rack, and of course the items 310 may be stored in the storage container. In an embodiment, the rack 131 may be a high rack. The rack 131 includes multiple layers which are vertically stacked, each being able to hold multiple items 310 or a storage container such as a tray. The rack 131 includes at least one support portion 330. In addition, in an embodiment, the items 310 may also be hung on a hook or pole within the rack 131 or on the rack 131. The items 310 may be placed within or on an external surface of the rack 131 in any suitable manner.

Under the control of the control system, the access device 110 takes the storage container out from a container support 131 in the storage area and carries to a dock location. Then, the carrying device 110 carries the storage container on the dock location from the dock location to the workstation 140. The workstation 140 may operate the storage container. Finally, after the storage container is operated completely, the storage container may be carried by the carrying device 110 to the dock location, and the storage container on the dock location is carried by the access device 110 to the storage area and placed on the container support 131. Through cooperation of the access device and the carrying device in different work areas, the number of access devices and carrying devices as well as tasks performed by the access device and the carrying device are reasonably allocated, and the warehousing access is implemented and the device cost is reduced.

The control system 120 is a software system running on a server and having capabilities of data storage and information processing, and may be connected to the access device, the carrying device, a hardware input system, and other software systems in a wireless or wired mode. The control system 120 may include at least one server, and may have a centralized control architecture or a distributed computing architecture. The server may have a processor 121 and a memory 122. The memory 122 may include an order pool 123.

The warehousing accessing system and method provided by the present disclosure are explained below in detail through the embodiments.

Embodiment One

Figure 4:
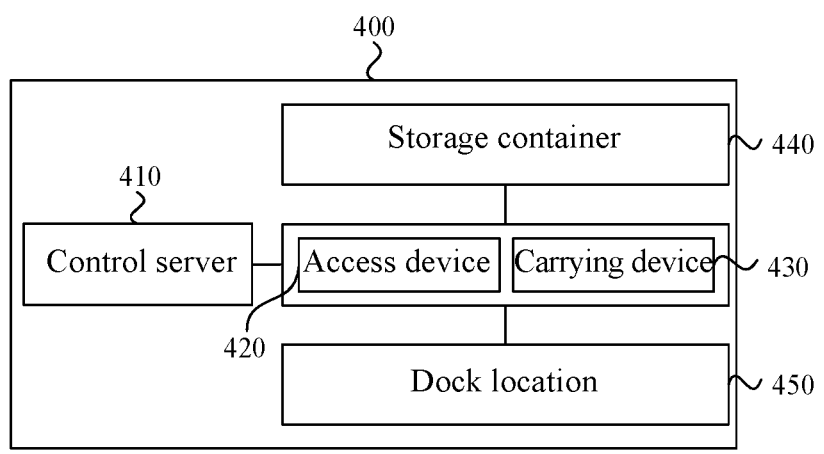
FIG. 4 is a block diagram of a warehousing access system provided by embodiment one of the present application.

FIG. 4 is a block diagram of a warehousing access system provided by embodiment one of the present application. This embodiment is applicable to a case of accessing a storage container in a storage area. The system may implement the warehousing access method in any embodiment of the present application. The system 400 includes: a control server 410, an access device 420, a carrying device 430, a storage container 440 and a dock location 450. The access device 420 and the carrying device 430 are communicatively connected to the control server 410 separately. The storage container 440 holds items, and the storage container 440 is located at a container support. The container support and the storage container 440 are located in the storage area.

The control server 410 is configured to, in response to an item operation request, determine a target storage container 440 for operation, a first target dock location 450 for docking the target storage container 440, a first target access device 420 for taking out the target storage container 440, and a first target carrying device 430 for carrying the target storage container 440, and send a container take-out instruction to the first target access device 420 and a container carrying instruction to the first target carrying device 430.

The first target access device 420 is configured to, in response to the container take-out instruction, take the target storage container 440 out from a current storage location and carry to the first target dock location 450.

The first target carrying device 430 is configured to carry the target storage container 440 from the first target dock location 450 to a workstation for operation in response to the container carrying instruction;

The control server 410 is further configured to, in response to an operation complete instruction, determine a target storage location for storing the target storage container 440, a second target dock location 450 for docking the target storage container 440, the second target access device 420 for storing the target storage container 440, and the second target carrying device 430 for carrying the target storage container 440, and send a container storing instruction to the second target access device 420 and the container carrying instruction to the second target carrying device 430.

The second target carrying device 430 is configured to, in response to the container carrying instruction, carry the target storage container 440 from the workstation to the second target dock location 450.

The second target access device 420 is further configured to, in response to the container storing instruction, carry the target storage container 440 from the second target dock location 450 to the storage area and store at the target storage location.

In the embodiment of the present application, the system may be applied to a traditional warehousing environment or a high warehousing environment. The scenario applied by the system at least includes the storage area and the picking area. The storage area is used for storing the storage container, such as a tray or a bin. The tray or the bin may also be stored on the rack or on the high rack. The control server is used for storing, updating, and managing a storage information repository, and performing overall management on the storage state of the storage container according to a received request or indication and an instruction issued by the storage information repository to the device.

The storage area is provided with the access device in which the storage container is stored or taken out. The access device may be a forklift, and the forklift may be a manned forklift or an unmanned forklift. The forklift may perform at least one of a carrying operation and an accessing operation according to an instruction sent by the control server. This embodiment may use the manned forklift. Correspondingly, the unmanned forklift may use any one of multiple navigate modes or the combination thereof, such as a two-dimensional code, a simultaneous localization and mapping (SLAM) or the combination thereof. The access device may also be a robot, which may be a stacking robot to perform the access operation on the storage container in the high storage rack.

The picking area is used for temporarily placing a storage container to be stored or taken-out for further operation of the workstation in the picking area. The picking area is provided with the carrying device, which may be a robot. The robot may perform a carrying operation according to an instruction sent by the control server.

In this embodiment, a certain number of dock locations are set in the storage area or at a boundary between the picking area and the workstation, and are used for the connection of the carrying operation of the storage container in the storage area and the picking area. The system may include one or more dock locations, and the dock location may be disposed in a fixed location area, or flexibly change the configured location area to improve the storage efficiency. Through the cooperation of the access device in the storage area and the carrying device in the picking area, the storing or taking operation of the storage container out is completed, and at the same time, the items in the storage container are stored or taken out through the workstation.

In the embodiment of the present application, when the items in the storage environment are operated, i.e., the items are stored or taken out, the storage container corresponding to the items needs to be carried to the workstation for operation. After operation is performed on the items corresponding to the storage container at the workstation, the storage container is carried to the storage area.

In an embodiment, the item operation request is a control command issued by a worker or a system, and may include information such as information and operation mode of the item to be operated. After receiving the item operation request, the control server determines a target storage container for operation, a first target dock location for docking the target storage container, a first target access device for taking the target storage container out, and a first target carrying device for carrying the target storage container. The target storage container may be a storage container to be stored by target items associated with the item operation request or a storage container in which the target items are located. When storing the items, an idle storage container may be selected as the target storage container according to information such as a category of items stored in the storage information repository, or an idle storage container which is also close to the picking area as the target storage container. The items may be taken out according to information of the items stored in the storage information repository. In the storage container storing the target item, the storage container which is close to the picking area may be selected as the target storage container. Correspondingly, a current storage location of the target storage container is determined. This embodiment does not limit the selection mode of the target storage container.

The first target dock location refers to a dock location for docking the target storage container when the target storage container is taken out from the storage area, so that devices in the storage area and the picking area are docked through the first target dock location, completing a handover operation in carrying the target storage container. The first target access device refers to a device in the storage area for taking the target storage container out from the storage area, which may be the forklift as described above. The first target carrying device refers to a device for carrying a target storage container, which may be a robot as described above. In view of the high device cost of the first target access device, this embodiment limits the function of the first target access device to take-out of the container as much as possible, and implements a carrying function of the first target carrying device as much as possible. Correspondingly, the first target dock location may be disposed at a location close to a current storage location of the target storage container, and the first target carrying device may work in the picking area and the storage area.

In this embodiment, after determining an operation object and an execution body, the control server sends the container take-out instruction to the target access device and the container carrying instruction to the first target carrying device. The container take-out instruction and the container carrying instruction may include target storage container information, item operation information, carrying location information, execution action information and the like.

In an embodiment, the control server determines an idle dock location as the first target dock location of the target storage container according to current dock information of at least one dock location in a storage information repository, where, this idle dock location is closest to the current storage location and has a storage space containing a target storage container. In this way, quick connecting between the carrying and accessing operations of the target storage container can be achieved, and the maximum carrying performance of the carrying device in the work area can be improved. It is to be understood that a distance between the first target dock location and the current storage location is less than a distance between the workstation and the current storage location. The control server may generate the container take-out instruction according to the target storage container, the current storage location, the first target dock location and the first target access device, and generate the container carrying instruction according to the target storage container, the first target dock location, the first target carrying device and the workstation, thereby sending the container take-out instruction to the first target access device, and sending the container carrying instruction to the first target carrying device.

Correspondingly, the first target access device in the storage area takes the target storage container out from a current storage location and carries from the current storage location to the first target dock location in response to the container take-out instruction. Then, according to location information of the first target dock location, the first target carrying device moves to the first target dock location; and in response to the container carrying instruction, the target storage container is carried from the first target dock location to the workstation to complete the automated container take-out operation and reduce the carrying operation of the first target access device as much as possible.

In this embodiment, after the target storage container is carried to the workstation, the worker or the robot in the workstation may operate the target storage container. For example, the worker or the robot places the items to be stored in the target storage container, or takes out the items to be taken out from the target storage container. The worker or the robot feeds back the operation complete instruction to the server.

In an embodiment, the control server is further configured to determine a target storage location for storing the target storage container, the second target dock location for docking the target storage container, the second target access device for storing the target storage container, and the second target carrying device for carrying the target storage container. The target storage container is a storage container after the operation at the workstation. The target storage location is a specific location in which the target storage container is to be placed in the storage area. The target storage location may be an original storage location when the target storage container is taken out, or may be a target storage location re-determined according to a location selection strategy. Exemplarily, the location selection strategy may classify and store the target storage container according to a current storage information repository, i.e., the location selection strategy selects a storage location in which items of a same type are located and determines an idle location having a storage space containing the target storage container as the target storage location; or the location selection strategy may perform storage according to the heat or carrying frequency of the items in the target storage container, i.e., the location selection strategy selects a location in which the target storage container is easily grasped and carried to the target storage location. This embodiment does not limit the manner of determining the target storage location. Any manner for implementing determination of the target storage location and facilitating determination of efficient access location may be applied to this embodiment.

The second target dock location refers to a dock location for docking the target storage container when the target storage container is carried from the workstation to the storage area, so that devices in the storage area and the picking area are docked at the second target dock location, completing the handover operation in carrying the target storage container, so that the first carrying device performs the carrying operation as much as possible, and the second access device performs the carrying operation as few as possible, thereby saving the number of the second access devices, and making the second access devices dedicated to the access operation. According to a relative location relationship between the target storage location and the current storage location of the target storage container in the storage area, the second target dock location and the first target dock location are same or different locations. It is to be understood that, in the case where the target storage location is the current storage location or nearby the current storage location, the second target dock location and the first target dock location may be same locations. In the case where the target storage location is neither the current storage location nor nearby the current storage location, the warehousing efficiency is improved according to an optimal path principle, the second target dock location and the first target dock location may be different locations.

In an embodiment, to improve the maximum carrying performance in the work area of the carrying device and reduce the carrying operation of the access device, the idle dock location closest to the current storage location and having the storage space containing the target storage container is determined as the second target dock location of the target storage container according to the current dock information of at least one dock location in the storage information repository. It is to be understood that a distance between the second target dock location and the target storage location is less than a distance between the workstation and the target storage location.

After the target storage container is carried from the storage area to the workstation, the first target carrying device may drop the target storage container and perform other tasks, or may always carry the target storage container until the target storage container is operated and then carry the target storage container to the second target dock location. Therefore, the first target carrying device and the second target carrying device are same or different devices.

In this embodiment, after determining an operation object and an execution body, the control server may generate the container carrying instruction according to the target storage container, the workstation, the second target dock location and the second target carrying device, and generate the container storing instruction according to the target storage container, the target storage location, the second target dock location and the second target access device, thereby sending the container carrying instruction to the second target carrying device and sending the container storing instruction to the second target access device. The container carrying instruction and the container storing instruction may include target storage container information, item operation information, carrying location information, execution action information and the like.

Correspondingly, the second target carrying device located at the workstation carries, in response to the container carrying instruction, the target storage container from the workstation to the second target dock location, and then the second target access device moves to the second target dock location; in response to the container storing instruction, the target storage container is carried from the second target dock location to the storage area and stored in the target storage location to complete the automatic container storing operation and reduce the carrying operation of the second target access device as much as possible.

Figure 5:
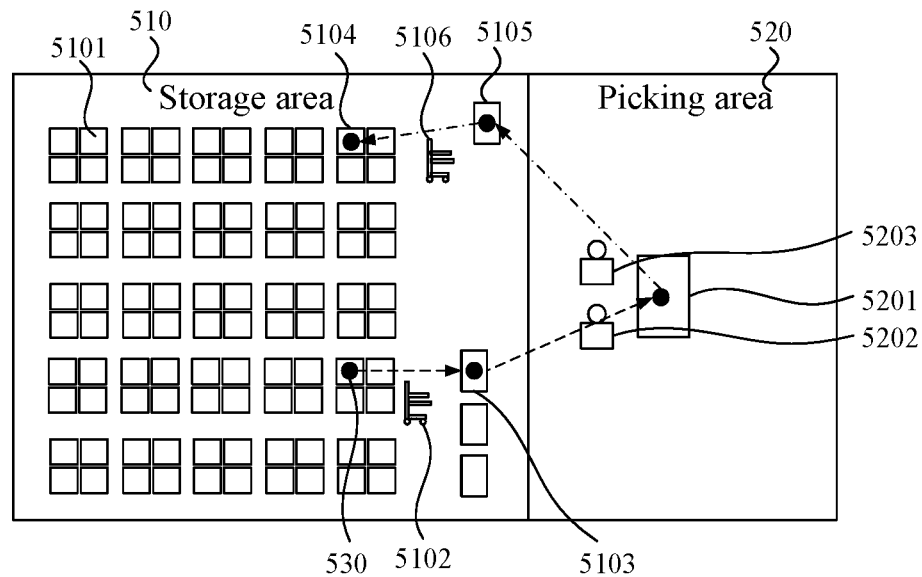
FIG. 5 is a schematic diagram of accessing a target storage container provided by embodiment one of the present application.

Exemplarily, FIG. 5 is a schematic diagram of accessing the target storage container. It is assumed that the warehouse is divided into the storage area 510 and the picking area 520. The storage area 510 has container supports 5101, and is provided with the access device and the dock location. The storage container 530 is stored in the storage area 510. The access device includes the first target access device 5102 and the second target access device 5106. The dock location includes the first target dock location 5103 and the second target dock location 5105. The picking area 520 is provided with the workstation 5201 and the carrying device. The carrying device includes the first target carrying device 5202 and the second target carrying device 5203.

When receiving the item operation request, the control server determines the target storage container 530, determines an idle first target dock location 5103 close to the current storage location according to the current storage location of the target storage container 530, and designates the first target access device 5102 and first target carrying device 5202. The control server may generate the container take-out instruction according to the first target access device 5102, the first target dock location 5103 and the current storage location of the target storage container 530. The control server may further generate the container carrying instruction according to the target storage container 530, the first target dock location 5103, the first target carrying device 5202 and the workstation 5201. The control server may send the container take-out instruction to the first target access device 5102 and send the container carrying instruction to the first target carrying device 5202. Correspondingly, the first target access device 5102 takes the target storage container 530 out from the current storage location and carries from the current storage location to the first target dock location 5103 in response to the container take-out instruction. Then, according to location information of the first target dock location 5103, the first target carrying device 5202 moves to the first target dock location 5103; and in response to the container carrying instruction, the target storage container 530 is carried from the first target dock location 5103 to the workstation 5201, as shown by dotted line paths in FIG. 5.

After the workstation 5201 completes the operation on the items, the control server receives the operation complete instruction and determines the target storage location of the target storage container 530, assumes the target storage location to be 5104, determines an idle second target dock location 5105 close to the current storage location according to the current storage location 5104, and designates the second target access device 5106 and the second target carrying device 5203. The control server may generate the container carrying instruction according to the target storage container 530, the workstation 5201, the second target dock location 5105 and the second target access device 5106. The control server may further generate the container storing instruction according to the target storage container 530, the second target dock location 5105, the second target carrying device 5203 and the target storage location 5104. The control server may send the container carrying instruction to the second target carrying device 5203 and the container storing instruction to the second target access device 5106. Correspondingly, the second target carrying device 5203 carries, in response to the container carrying instruction, the target storage container 530 from the workstation 5201 to the second target dock location 5105. Then the second target access device 5106 moves to the second target dock location 5105; in response to the container storing instruction, the target storage container 530 is carried from the second target dock location 5105 to the target storage location 5104, as shown by the dotted line paths in FIG. 5.

In an embodiment, the control server may control, according to a device for docking the target storage container at the target dock location, such as the first target carrying device or the second target access device, for information such as a receiving time for a carrying or storing instruction, an execution time or an execution progress, before the device for carrying the target storage container to the target dock location carries the target storage container to the target dock location, the device for docking the target storage container at the target dock location to move to the target dock location to wait for the target storage container to be carried to the target dock location. Thus when the target storage container is carried to the target dock location, the device for docking the target storage container at the target docking location may perform subsequent carrying or accessing instructions without any delay, improving access efficiency of the target storage container.

In the above operation process, at least one of a relative location and a relative angle of the container may deviate. The accumulated deviation of at least one of the location and the angle may cause that the automatic access system fails to operate normally and the container may deviate, collapse or collide. Therefore, in this embodiment, the deviation of the container may be corrected in three aspects: device, dock location or storage container. In an embodiment, the device is provided with a sensor, so that the device corrects at least one of a location and an angle of the target storage container in a process of docking, placing or carrying the target storage container. The device is at least one of the access device and the carrying device. In an embodiment, the dock location is provided with a physical correction apparatus to correct at least one of the location and the angle of the target storage container placed on the dock location. In an embodiment, a bottom center of the storage container is configured with a readable marker thus when the device is docked with the target storage container, the device acquires a center location of the target storage container through scanning, and corrects at least one of a location and an angle of the target storage container placed on the device. The device is at least one of the access device and the carrying device. The readable marker may be a two-dimensional code or other markers. The above three correction methods may be used alone or in combination of at least two methods.

In an embodiment, from a perspective of the device, the device may be provided with a visual sensor, a touch sensor or a location sensor. The sensor is used for capture a relative deviation value of at least one of the location and the angle of the storage container, so that the robot corrects the deviation of at least one of the location and the angle according to a correcting function of the robot itself in a docking process of grasping the storage container, placing the storage container or carrying the storage container.

From the perspective of the storage container, the readable marker may be pasted on a specific location of the storage container. For example, a two-dimensional code is pasted on the bottom center of the storage container. The device scans the two-dimensional code on the center location through a scanning function, thereby determining a relative deviation value of the center location with respect to the device, so that in the docking process of grasping the storage container, the device corrects the offset of at least one of the location and the angle of the storage container included in the relative deviation value according to the correcting function of the device, and the bottom center of the storage container is aligned with the device center to prevent the storage container from deviating on the device.

From a perspective of the dock location, this embodiment may also be configured with a physical correction apparatus on the dock location. The physical correction apparatus may be a protruding limitation apparatus such as a fixed fence or frame, or may be a visual identifier with a specific color or pattern. In this way, the robot places the storage container at a specified location along the limitation of the protruding apparatus when placing the storage container; or the robot places, in combination with multiple sensors provided on the robot, the storage container at the specified location through the identification of the visual identifier when placing the storage container. Correspondingly, in the case in which the dock location is provided with the physical correction apparatus, the dock location is usually fixed in the warehousing environment and cannot be flexibly changed. It is to be understood that the physical correction apparatus has a slightly larger size than the outline of the storage container, thereby limiting the deviation of the storage container to a tolerable range, and avoiding the impact on the re-grasping and carrying operations. Therefore, this embodiment ensures, through correcting at least one of the location and the angle for placing the storage container, that the deviation is controlled to the tolerable range when the storage container is carried or picked again. This avoids the collapse or collision at the time of grasping, placing or carrying the storage container caused by the accumulated deviation of the storage container.

Figure 6:
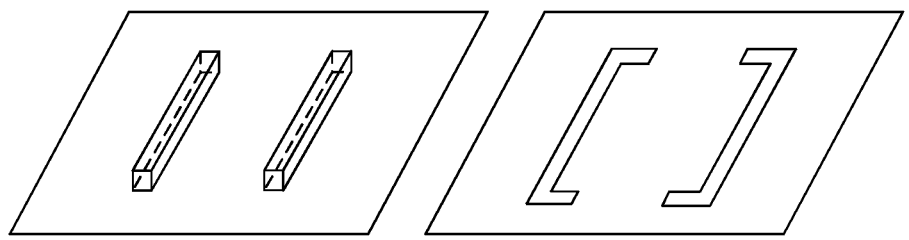
FIG. 6 is an exemplary diagram of a physical correction apparatus on a dock location provided by embodiment one of the present application.

Exemplarily, FIG. 6 is an exemplary diagram of a physical correction apparatus on the dock location. The left side in FIG. 6 is the protruding limitation apparatus, and the right side in FIG. 6 is the visual identifier in a ribbon form. The storage container is placed in the physical correction apparatus to limit the deviation of the storage container within the tolerable range.

In the technical solution of this embodiment, the control server determines, in response to an item operation request, the target storage container for operation, the first target dock location for docking the target storage container, the first target access device for taking the target storage container out, and the first target carrying device for carrying the target storage container, and sends the container take-out instruction to the first target access device and the container carrying instruction to the first target carrying device. The first target access device takes the target storage container out from the current storage location and carries from the current storage location to the first target dock location in response to the container take-out instruction. The first target carrying device is configured to carry, in response to the container carrying instruction, the first target storage container from the first target dock location to the workstation for operation. Correspondingly, the control server determines, in response to an operation complete instruction, the target storage location stored in the target storage container, the second target dock location for docking the target storage container, the second target access device for storing the target storage container, and the second target carrying device for carrying the target storage container, and sends a container storing instruction to the second target access device and the container carrying instruction to the second target carrying device; the second target carrying device carries, in response to the container carrying instruction, the target storage container from the workstation to the second target dock location; and the second target access device carries, in response to the container storing instruction, the target storage container from the second target dock location to the storage area and stores in the target storage location.

According to the control of the control server, the embodiment of the present application takes the dock location as a transfer station of the storage area and the picking area. The collaboration of devices in different areas reduces the number of access devices used in the warehousing environment storage area, implements intelligent access operations for the items, reduces labor and device costs, and improves the access efficiency of the storage container.

Embodiment Two

This embodiment provides an exemplary implementation mode of a warehousing access system on the basis of the embodiment one, which is able to reduce the carrying operation of an access device.

Referring to a block diagram of a warehousing access system shown in FIG. 4, the control server 410 is configured to, in response to an item operation request, determine a target storage container 440 for operation, a first target dock location 450 for docking the target storage container 440, a first target access device 420 for taking the target storage container 440 out, and a first target carrying device 430 for carrying the target storage container 440, and send a container take-out instruction to the first target access device 420 and a container carrying instruction to the first target carrying device 430.

In an embodiment, the system 400 includes at least one dock location 450.

In an embodiment, the dock location 450 is located in the storage area or at the boundary between a picking area and a workstation.

In an embodiment, in a case where the system 400 includes multiple dock locations 450, the control server 410 is configured to select an idle dock location 450 and determine that the idle dock location 450 is a target dock location 450 of the target storage container 440 according to current docking information of at least one dock location 450 in a storage information repository.

The first target access device 420 is configured to, in response to the container take-out instruction, take the target storage container 440 out from a current storage location and carry to the first target dock location 450.

In an embodiment, the first target carrying device 430 is further configured to move, in response to the container carrying instruction, to the first target dock location 450 in advance to wait for the target storage container 440 to be carried to the first target dock location 450.

The first target carrying device 430 is configured to carry the first target storage container 440 from the first target dock location 450 to a workstation for operation in response to the container carrying instruction.

The control server 410 is further configured to, in response to an operation complete instruction, determine a target storage location for storing the target storage container 440, a second target dock location 450 for docking the target storage container 440, the second target access device 420 for storing the target storage container 440, and the second target carrying device 430 for carrying the target storage container 440, and send a container storing instruction to the second target access device 420 and the container carrying instruction to the second target carrying device 430.

In an embodiment, in a case where the system 400 includes multiple dock locations 450, the control server 410 is configured to select an idle dock location 450 and determine that the idle dock location 450 is a target dock location 450 of the target storage container 440 according to current docking information of at least one dock location 450 in a storage information repository.

In an embodiment, the first target dock location 450 and the second target dock location are same or different locations.

In an embodiment, the first target carrying device 430 and the second target carrying device 430 are same or different devices.

The second target carrying device 430 is configured to carry the target storage container 440 from the workstation to the second target dock location 450 in response to the container carrying instruction.

In an embodiment, the second target access device 420 is further configured to, in response to the container storing instruction, move to the second target dock location 450 in advance to wait for the target storage container 440 to be carried to the second target dock location 450.

The second target access device 420 is further configured to, in response to the container storing instruction, carry the target storage container 440 from the second target dock location 450 to the storage area and store at the target storage location.

In an embodiment, the device is provided with a sensor, so that the device corrects at least one of a location and an angle of the target storage container 440 in a process of docking, placing or carrying the target storage container 440. The device is at least one of the access device 420 and the carrying device 430.

In an embodiment, the dock location 450 is provided with a physical correction apparatus to correct at least one of a location and an angle of the target storage container 440 placed on the dock location 450.

In an embodiment, a bottom center of the storage container 440 is configured with a readable marker; thus in response to determining that the device is docked with the target storage container 440, the device acquires a center location of the target storage container 440 through scanning, and corrects at least one of a location and an angle of the target storage container 440 placed on the device. The device is at least one of the access device 420 and the carrying device 430.

In an embodiment, the carrying device 430 is a carrying robot, and the access device 420 is a stacking robot or a forklift.

In the embodiment of the present application, when the goods in the storage environment are operated, i.e., the goods are stored or taken out, the storage container corresponding to the goods needs to be carried to the workstation for operation, after operation is performed on the goods corresponding to the storage container at the workstation, the storage container is carried to the storage area.

In an embodiment, the item operation request is a control command issued by an operator or a system, and may include information such as information and operation mode of the items to be operated. The control server determines, according to an item operation request, the target storage container, the first target access device and the first target carrying device, and determines an idle dock location closest to the current storage location and having a storage space containing a target storage container as the first target dock location of the target storage container according to current dock information of at least one dock location in a storage information repository. The control server may generate the container take-out instruction according to the target storage container, the current storage location, the first target dock location and the first target access device, and generate the container carrying instruction according to the target storage container, the first target dock location, the first target carrying device and the workstation, thereby sending the container take-out instruction to the first target access device, and the container carrying instruction to the first target carrying device.

Correspondingly, the first target access device takes the target storage container out from a current storage location and carries from the current storage location to the first target dock location. The first target carrying device moves to the first target dock location in advance, and when the target storage container is carried to the first target dock location, the first target carrying device carries the target storage container from the first target dock location to the workstation. The worker or the robot in the workstation may operate the target storage container, for example, placing the items to be stored in the target storage container, or taking out the items to be taken out from the target storage container. The worker or the robot feeds back the operation complete instruction to the server.

In an embodiment, the control server determines, according to an operation complete instruction, the second target carrying device, the second target access device, and the target storage location stored in the target storage container, and determines the idle dock location closest to the current storage location and having the storage space containing the target storage container as the second target dock location of the target storage container according to the current dock information of at least one dock location in the storage information repository. The control server may generate the container carrying instruction according to the target storage container, the workstation, the second target dock location and the second target carrying device, and generate the container storing instruction according to the target storage container, the target storage location, the second target dock location and the second target access device, thereby sending the container carrying instruction to the second target carrying device and the container storing instruction to the second target access device.

Correspondingly, the second target carrying device carries the target storage container from the workstation to the second target dock location. The second target access device moves to the second target dock location in advance; and when the target storage container is carried to the second target dock location, the second target access device carries the target storage container from the second target dock location to the storage area and stores in the target storage location.

This embodiment corrects a location of the target storage container in the entire carrying process in a docking process of grasping the storage container, placing the storage container or carrying the storage container, according to the sensor on the device, the readable mark at the bottom center of the storage container or the physical correction apparatus on the dock location, so that the deviation of the storage container is controlled within an tolerable range.

In the technical solution of this embodiment, the control server in the warehousing system coordinates a storage state of the storage container, and controls, according to the operation process of taking the storage container out from the storage area to the workstation and moving the storage container back to the storage area after the operation of the workstation, the access device to be responsible for the container access operation only, and the carrying device to perform the carrying operation as much as possible, thereby reducing the number of the access devices and the usage cost of the device. At the same time, the device for docking the storage container at the dock location is controlled to move to the target dock location in advance, and in the docking process of grasping, placing or carrying the storage container, at least one of the location and the angle of the target storage container is corrected, The collaboration of the access device and the carrying device improves access accuracy and efficiency of the warehousing environment.

Embodiment Three

Figure 7:
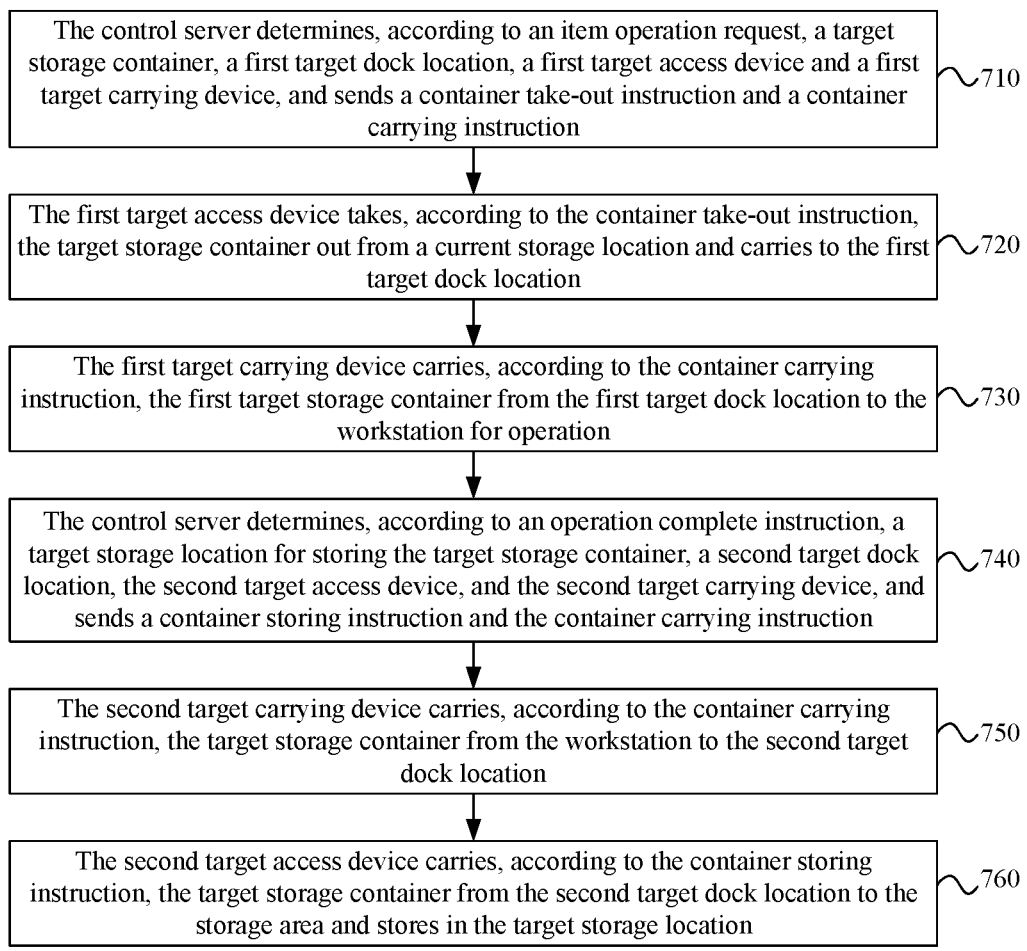
FIG. 7 is a flowchart of a warehousing access method provided by embodiment three of the present application.

FIG. 7 is a flowchart of a warehousing access method provided by embodiment three of the present application. This embodiment is applicable to a case of accessing items through a storage container in a storage are. The method may be implemented by a warehousing access system. The method may be applied to a traditional warehousing environment or a high warehousing environment. A storage scenario applied by the method at least includes the storage area and the picking area. The storage area is used for storing the storage container, such as a tray or a bin. The tray or the bin may also be stored on the rack or on the high rack. The method includes steps 710 to 760.

In step 710, the control server determines, according to an item operation request, a target storage container for operation, a first target dock location for docking the target storage container, a first target access device for taking the target storage container out, and a first target carrying device for carrying the target storage container, and sends a container take-out instruction to the first target access device and a container carrying instruction to the first target carrying device.

In the embodiment of the present application, when the goods in the storage environment are operated, i.e., the goods are stored or taken out, the storage container corresponding to the goods needs to be carried to the workstation for operation. After operation is performed on the goods corresponding to the storage container at the workstation, the storage container is carried to the storage area.

In this embodiment, the item operation request is a control command issued by a worker or a system, and may include information such as information and operation mode of the item to be operated. The control server determines the target storage container, the first target dock location, the first target access device, and the first target carrying device according to the item operation request, a storage information repository, dock information, and an optimal route. The dock location is located in the storage area or at the boundary between the picking area and the workstation. At least one dock location is provided. The carrying device may be a carrying robot, and the access device may be a stacking robot or a forklift. The target storage container may be a storage container to store the target item associated with the item operation request or a storage container in which the target item is located. The first target dock location refers to a dock location for docking the target storage container when the target storage container is taken out from the storage area, so that devices in the storage area and the picking area are docked through the first target dock location, completing a handover operation in carrying the target storage container. In this way, the first carrying device performs the carrying operation as much as possible, and the first access device performs the carrying operations as few as possible, thereby saving the number of the first access device, and making the first access device dedicated to the access operation.

The control server may generate the container take-out instruction according to the target storage container, the current storage location, the first target dock location and the first target access device, and generate the container carrying instruction according to the target storage container, the first target dock location, the first target carrying device and the workstation, thereby sending the container take-out instruction to the first target access device, and the container carrying instruction to the first target carrying device.

In step 720, the first target access device takes, according to the container take-out instruction, the target storage container out from a current storage location and carries to the first target dock location.

In the embodiment of the present application, the first target access device takes the target storage container out from the current storage location and carries to the first target dock location with minimal carrying operations.

In step 730, the first target carrying device carries, according to the container carrying instruction, the first target storage container from the first target dock location to the workstation for operation.

In the embodiment of the present application, the first target carrying device performs the carrying operation to a maximum extent. After the target storage container is carried to the workstation, the worker or the robot in the workstation may operate the target storage container, for example, placing the items to be stored in the target storage container, or taking out the items to be taken out from the target storage container. The worker or the robot feeds back the operation complete instruction to the server.

In step 740, the control server determines, according to an operation complete instruction, a target storage location stored in the target storage container, a second target dock location for docking the target storage container, the second target access device for storing the target storage container, and the second target carrying device for carrying the target storage container, and sends a container storing instruction to the second target access device and the container carrying instruction to the second target carrying device.

In the embodiment of the present application, the target storage container is a storage container operated at the workstation. The target storage location is a specific location in which the target storage container is to be placed in the storage area, and the target storage location may be an original storage location when the target storage container is taken out, or may be a target storage location re-determined according to a location selection strategy. The second target dock location refers to a dock location for docking the target storage container when the target storage container is carried from the workstation to the storage area, so that devices in the storage area and the picking area are docked through the second target dock location, completing the handover operation in carrying the target storage container. In this way, the first carrying device performs the carrying operation as much as possible, and the second access device performs the carrying operation as few as possible, thereby reducing the number of the second access device, and making the second access device dedicated to the access operation.

The control server may generate the container carrying instruction according to the target storage container, the workstation, the second target dock location and the second target carrying device, and generate the container storing instruction according to the target storage container, the target storage location, the second target dock location and the second target access device, thereby sending the container carrying instruction to the second target carrying device and the container storing instruction to the second target access device.

In step 750, the second target carrying device carries, according to the container carrying instruction, the target storage container from the workstation to the second target dock location.

In the embodiment of the present application, the second target carrying device maximally performs the carrying operation, and carries the target storage container from the workstation to the second target dock location.

In step 760, the second target access device carries, according to the container storing instruction, the target storage container from the second target dock location to the storage area and stores in the target storage location.

In the embodiment of the present application, the second target access device carries the target storage container from the second target dock location and stores to the target storage location with minimal carrying operations.

In the technical solution of the embodiment, the control server determines, in response to an item operation request, the target storage container for operation, the first target dock location for docking the target storage container, the first target access device for taking the target storage container out, and the first target carrying device for carrying the target storage container, and sends the container take-out instruction to the first target access device and the container carrying instruction to the first target carrying device. The first target access device takes the target storage container out from the current storage location and carries from the current storage location to the first target dock location in response to the container take-out instruction. The first target carrying device is configured to carry, in response to the container carrying instruction, the first target storage container from the first target dock location to the workstation for operation. Correspondingly, the control server determines, in response to an operation complete instruction, the target storage location stored in the target storage container, the second target dock location for docking the target storage container, the second target access device for storing the target storage container, and the second target carrying device for carrying the target storage container, and sends a container storing instruction to the second target access device and the container carrying instruction to the second target carrying device; the second target carrying device carries, in response to the container carrying instruction, the target storage container from the workstation to the second target dock location; and the second target access device carries, in response to the container storing instruction, the target storage container from the second target dock location to the storage area and stores at the target storage location.

According to the control of the control server, the embodiment of the present application takes the dock location as transfer stations of the storage area and the picking area. The collaboration of devices in different areas reduces the number of access devices used in the warehousing environment storage area implements intelligent access operation for the items, reduces labor and device costs, and improves access efficiency of the storage container.

Embodiment Four

Figure 8:
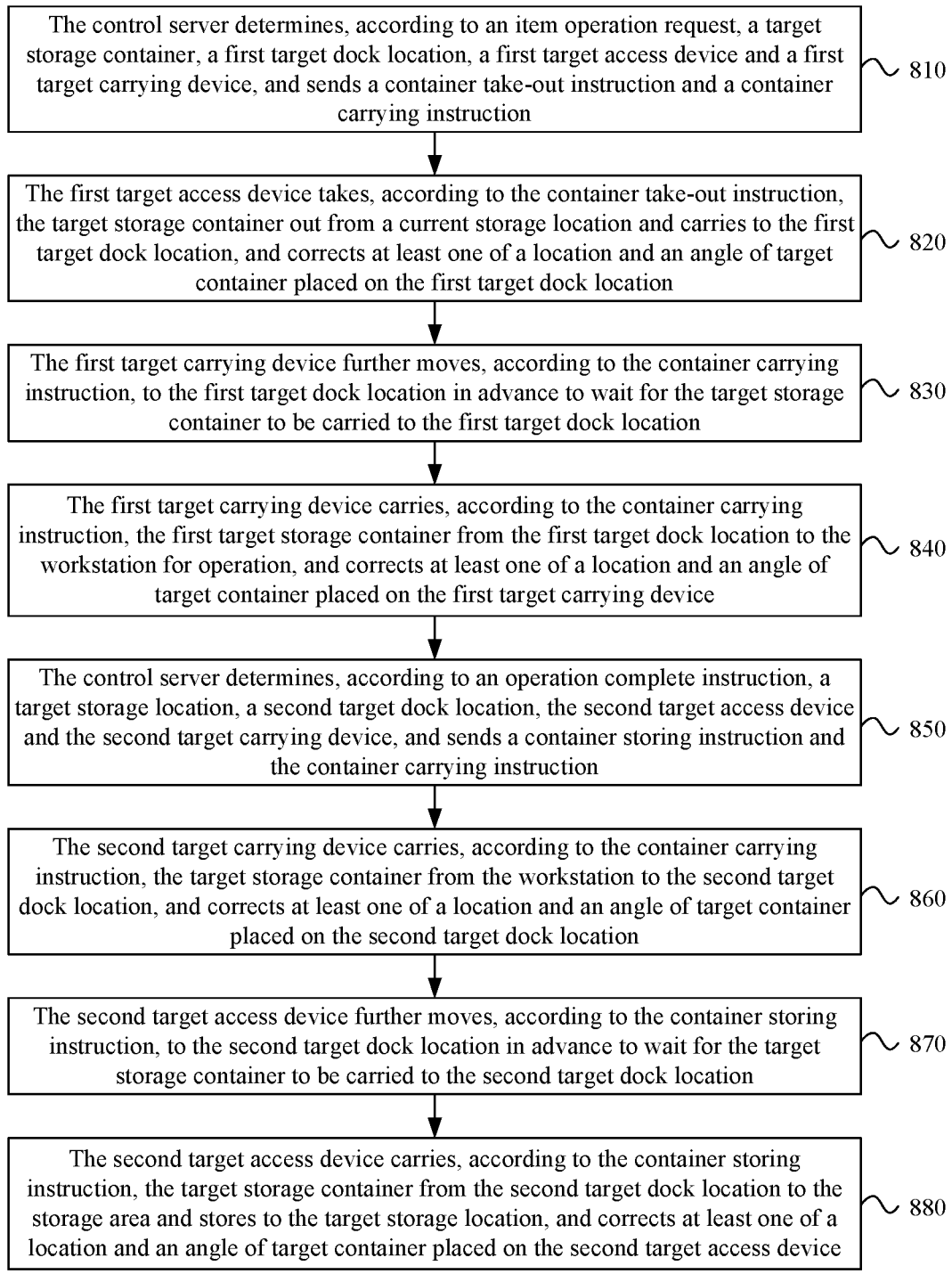
FIG. 8 is a flowchart of a warehousing access method provided by embodiment four of the present application.

This embodiment provides an exemplary implementation mode of a warehousing access method on the basis of the embodiment three, which is able to reduce the carrying operation of an access device. FIG. 8 is a flowchart of a warehousing access method provided by embodiment four of the present application. The method includes steps 810 to 880.

In step 810, the control server determines a target storage container for operation, a first target dock location for docking the target storage container, a first target access device for taking the target storage container out and a first target carrying device for carrying the target storage container according to an item operation request, and sends a container take-out instruction to the first target access device and a container carrying instruction to the first target carrying device.

In an embodiment, the dock location is located in the storage area or at the boundary between a picking area and a workstation.

In an embodiment, at least one dock location is provided.

In an embodiment, in a case where multiple dock locations are provided, according to current docking information of at least one dock location in a storage information repository, an idle dock location is selected and determined as a target dock location of the target storage container.

In an embodiment, the idle dock location closest to the current storage location and having a storage space containing a target storage container as the first target dock location of the target storage container.

In an embodiment, the carrying device is a carrying robot, and the access device is a stacking robot or a forklift.

In step 820, the first target access device takes, according to the container take-out instruction, the target storage container out from a current storage location and carries to the first target dock location, and corrects at least one of a location and an angle of target container placed on the first target dock location.

In step 830, the first target carrying device further moves, according to the container carrying instruction, to the first target dock location in advance to wait for the target storage container to be carried to the first target dock location.

In step 840, the first target carrying device carries, according to the container carrying instruction, the first target storage container from the first target dock location to the workstation for operation, and corrects at least one of a location and an angle of target container placed on the first target carrying device.

In step 850, the control server determines, according to an operation complete instruction, a target storage location stored in the target storage container, a second target dock location for docking the target storage container, the second target access device for storing the target storage container, and the second target carrying device for carrying the target storage container, and sends a container storing instruction to the second target access device and the container carrying instruction to the second target carrying device.

In an embodiment, the first target carrying device and the second target carrying device are same or different devices.

In an embodiment, the first target carrying device and the second target carrying device are same or different devices.

In an embodiment, in a case where multiple dock locations are provided, according to current docking information of at least one dock location in a storage information repository, an idle dock location is selected and determined as a target dock location of the target storage container.

In an embodiment, the idle dock location closest to the target storage location and having a storage space containing a target storage container as the second target dock location of the target storage container.

In step 860, the second target carrying device carries, according to the container carrying instruction, the target storage container from the workstation to the second target dock location, and corrects at least one of a location and an angle of target container placed on the second target dock location.

In step 870, the second target access device further moves, according to the container storing instruction, to the second target dock location in advance to wait for the target storage container to be carried to the second target dock location.

In step 880, the second target access device carries, according to the container storing instruction, the target storage container from the second target dock location to the storage area and stores to the target storage location, and corrects at least one of a location and an angle of target container placed on the second target access device.

In an embodiment, the device corrects, according to location information of the target storage container detected by a sensor, at least one of a location and an angle of the target storage container in a process of docking, placing or carrying the target storage container. The device is at least one of the access device and the carrying device.

In an embodiment, the device corrects, according to a physical correction apparatus configured on a dock location, at least one of a location and an angle of the target storage container placed on the dock location, and the device is at least one of the access device and the carrying device.

In an embodiment, the device scans a readable marker at a bottom center of the target storage container, acquires a center location of the target storage container, and corrects at least one of a location and an angle of the target storage container placed on the device according to the center location. The device is at least one of the access device and one carrying device.

In the technical solution of this embodiment, the control server in the warehousing system coordinates a storage state of the storage container, and controls, according to the operation process of taking the storage container out from the storage area to the workstation and moving the storage container back to the storage area after the operation of the workstation, the access device to be responsible for the container access operation only, and the carrying device to perform the carrying operation as much as possible, thereby reducing the number of the access devices and usage cost of the device. At the same time, the device for docking the storage container at the dock location is controlled to move to the target dock location in advance, and in the docking process of grasping, placing or carrying the storage container, at least one of the location and the angle of the target storage container is corrected. The collaboration of the access device and the carrying device improves access accuracy and efficiency of the warehousing environment.

From the above description about the implementation mode, those skilled in the art can clearly understand that the embodiments of the present disclosure may be implemented by means of software plus a necessary general-purpose hardware platform, or may of course be implemented by hardware. Based on this understanding, the technical solutions provided by the embodiments of the present disclosure substantially, or the part contributing to the existing art, may be embodied in the form of a software product. The software product is stored in a computer readable storage medium, such as a computer floppy disk, a read-only memory (ROM), a random access memory (RAM), a flash, a hard disk or an optical disk, and includes several instructions for enabling a computer device (which may be a personal computer, a server or a network device) to execute the method according to each embodiment of the present disclosure.

It is to be noted that, in the embodiment of the system, the included multiple structures are just divided according to functional logic, and the division is not limited to this, as long as the corresponding functions can be realized. In addition, the specific names of the each functional structure are just intended for distinguishing, and are not to limit the protection scope of the embodiments of the present disclosure.

What is claimed is:

1. A warehousing access system, comprising:

a control server, an access device, a carrying device, a storage container and at least one dock location; the access device and the carrying device communicate with the control server separately, the storage container is located in a array at a storage area and is configured to hold items;

the control server is configured to, in response to an item operation request, determine a target storage container for operation, a first target dock location for docking the target storage container, a first target access device for taking the target storage container out, and a first target carrying device for carrying the target storage container, and send a container take-out instruction to the first target access device and a container carrying instruction to the first target carrying device;

the first target access device is configured to, in response to the container take-out instruction, move to a current storage location of the target storage container in the rack array, take the target storage container out from the current storage location in the rack array, carry the target storage container to the first target dock location, and place the target storage container on the first target dock location;

the first target carrying device is configured to, in response to the container carrying instruction, acquire the target storage container on the first target dock location by using a lifting mechanism of the first target carrying device, and carry the target storage container from the first target dock location to a workstation for operation;

the control server is further configured to, in response to an operation complete instruction, determine a target storage location for storing the target storage container, a second target dock location for docking the target storage container, a second target access device for storing the target storage container, and a second target carrying device for carrying the target storage container, and send a container storing instruction to the second target access device and the container carrying instruction to the second target carrying device;

the second target carrying device is further configured to, in response to the container carrying instruction, carry the target storage container from the workstation to the second target dock location, and place the target storage container on the second target dock location; and the second target access device is further configured to, in response to the container storing instruction, acquire the target storage container on the second target dock location, carry the target storage container from the second target dock location to the target storage location in the rack array, store the target storage container at the target storage location in the rack array;

wherein the carrying device is a carrying robot comprising a lifting mechanism, and the access device is one of a stacking robot or a forklift;

wherein an idle dock location closest to the current storage location selected from at least one idle dock location is determined as the first target dock location, an idle dock location closest to the target storage location selected from at least one idle dock location is determined as the second target dock location, the dock location is a transfer station of the storage area and a picking area, and the first target dock location and the second target dock location are same or different locations;

wherein the carrying device is configured to only run in the picking area, and the access device is configured to only run in the storage area; and wherein the dock location is provided with a physical correction apparatus to correct at least one of a location or an angle of the target storage container placed at the dock location.

2. The system of claim 1, wherein the first target carrying device and the second target carrying device are same or different devices.

3. The system of claim 1, wherein the second target access device is further configured to, in response to the container storing instruction, move to the second target dock location in advance to wait for the target storage container to be carried to the second target dock location; and/or, the first target carrying device is configured to, in response to the container carrying instruction, move to the first target dock location in advance to wait for the target storage container to be carried to the first target dock location.

4. The system of claim 1, wherein the dock location is located in the storage area or at a boundary between the picking area and the workstation.

5. The system of claim 1, wherein the system comprises at least one dock location.

6. The system of claim 5, wherein in a case where the system comprises a plurality of dock locations, the control server is configured to select and determine an idle dock location as a target dock location of the target storage container according to current docking information of at least one dock location in a storage information repository.

7. The system of claim 1, wherein at least one of the access device or the carrying device is configured with a sensor, to enable the at least one of the access device or the carrying device to correct at least one of a location or an angle of the target storage container in a process of docking, placing or carrying the target storage container.

8. The system of claim 1, wherein a readable marker is provided at a bottom center of the storage container, to enable at least one of the access device or the carrying device to, in response to determining that the at least one of the access device or the carrying device is being docked with the target storage container, scan the readable marker, acquire a center location of the target storage container, and correct at least one of a location or an angle of the target storage container placed on the at least one of the access device or the carrying device.

9. A warehousing access method, comprising:
using a control server to determine, according to an item operation request, a target storage container for operation, a first target dock location for docking the target storage container, a first target access device for taking the target storage container out, and a first target carrying device for carrying the target storage container, and send a container take-out instruction to the first target access device and a container carrying instruction to the first target carrying device;

using the first target access device, according to the container carrying instruction, to move to a current storage location of the target storage container in the rack array, to take the target storage container out from the current storage location in the rack array, to carry the target storage container to the first target dock location, and to place the target storage container on the first target dock location;

using the first target carrying device, according to the container carrying instruction, to acquire the target storage container on the first target dock location by using a lifting mechanism of the first carrying device, and to carry the target storage container from the first target dock location to a workstation for operation;

using the control server to determine, according to an operation complete instruction, a target storage location for storing the target storage container, a second target dock location for docking the target storage container, a second target access device for storing the target storage container, and a second target carrying device for carrying the target storage container, and send a container storing instruction to the second target access device and the container carrying instruction to the second target carrying device;

using the second target carrying device to carry, according to the container carrying instruction, the target storage container from the workstation to the second target dock location, and place the target storage container on the second target dock location; and using the second target access device, according to the container storing instruction, to acquire the target storage container on the second target dock location, to carry the target storage container from the second target dock location to the target storage location in the rack array, and to store the target storage container at the target storage location in the rack array;

wherein the carrying device is a carrying robot comprising a lifting mechanism, and the access device is one of a stacking robot or a forklift;

wherein an idle dock location closest to the current storage location selected from at least one idle dock location is determined as the first target dock location, an idle dock location closest to the target storage location selected from at least one idle dock location is determined as the second target dock location, the dock location is a transfer station of the storage area and a picking area, and the first target dock location and the second target dock location are same or different locations; and wherein the carrying device is configured to only run in the picking area, and the access device is configured to only run in the storage area;

using at least one of the access device or the carrying device to carry the target storage container to the target dock location, the workstation or the target storage location comprises:

using the at least one of the access device or the carrying device to correct, according to a physical correction apparatus provided at a dock location, at least one of a location or an angle of the target storage container placed at the dock location.

10. The method of claim 9, wherein the first target carrying device and the second target carrying device are same or different devices.

11. The method of claim 9, wherein using the first target carrying device to carry, according to the container carrying instruction, the first target storage container from the first target dock location to the workstation for operation comprises:

using the first target carrying device to move, according to the container carrying instruction, to the first target dock location in advance to wait for the target storage container to be carried to the first target dock location.

12. The method of claim 9, wherein using the second target access device to carry, according to the container storing instruction, the target storage container from the second target dock location to the storage area and stores at the target storage location comprises:

using the second target access device to move, according to the container storing instruction, to the second target dock location in advance to wait for the target storage container to be carried to the second target dock location.

13. The method of claim 9, wherein the first dock location and the second dock location are located in the storage area or at a boundary between the picking area and the workstation.

14. The method of claim 9, wherein the number of the dock location is one or more.

15. The method of claim 14, wherein using the control server to determine the first target dock location for docking the target storage container according to the item operation request and using the control server to determine the second target dock location for docking the target storage container according to the operation complete instruction comprises:

in a case of a plurality of dock locations, selecting and determining an idle dock location as a target dock location of the target storage container according to current docking information of at least one dock location in a storage information repository.

16. The method of claim 9, wherein using at least one of the access device or the carrying device to carry the target storage container to the target dock location, the workstation or the target storage location comprises:

using the at least one of the access device or the carrying device to correct, according to location information of the target storage container detected by a sensor, at least one of a location or an angle of the target storage container in a process of docking, placing or carrying the target storage container.

17. The method of claim 9, wherein using at least one of the access device or the carrying device to carry the target storage container to the target dock location, the workstation or the target storage location comprises:

using the at least one of the access device or the carrying device to scan a readable marker at a bottom center of the target storage container, acquire a center location of the target storage container, and correct at least one of a location or an angle of the target storage container placed on the at least one of the access device or the carrying device according to the center location.

* * * * *